US012106046B2

(12) United States Patent
Wackerly et al.

(10) Patent No.: US 12,106,046 B2
(45) Date of Patent: Oct. 1, 2024

(54) PERFORMANT RUN-TIME PARSING AND EDITING IN A CLIENT-SERVER MODEL

(71) Applicant: Hewlett Packard Enterprise Development LP, Houston, TX (US)

(72) Inventors: Shaun Wackerly, Lincoln, CA (US); Gurraj Atwal, Roseville, CA (US); Vali W. Lean, Sacramento, CA (US); Charles F. Clark, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 454 days.

(21) Appl. No.: 17/581,744

(22) Filed: Jan. 21, 2022

(65) Prior Publication Data

US 2023/0237259 A1    Jul. 27, 2023

(51) Int. Cl.
| | |
|---|---|
| *G06F 40/211* | (2020.01) |
| *G06F 3/0481* | (2022.01) |
| *G06F 3/0485* | (2022.01) |
| *G06F 40/166* | (2020.01) |

(52) U.S. Cl.
CPC .......... *G06F 40/211* (2020.01); *G06F 3/0481* (2013.01); *G06F 3/0485* (2013.01); *G06F 40/166* (2020.01)

(58) Field of Classification Search
CPC ...... G06F 40/166; G06F 40/211; G06F 40/14; G06F 40/143; G06F 40/137; G06F 40/103; G06F 40/106; G06F 3/0481; G06F 3/0485; G06F 16/9577

USPC .................................................. 715/276, 784
See application file for complete search history.

(56) References Cited

U.S. PATENT DOCUMENTS

| | | | | |
|---|---|---|---|---|
| 5,870,608 A | * | 2/1999 | Gregory ................ | G06F 40/284 717/131 |
| 6,747,680 B1 | * | 6/2004 | Igarashi .............. | G06F 3/04855 715/764 |
| 2008/0270934 A1 | * | 10/2008 | Firebaugh ................. | G06F 8/38 715/784 |
| 2008/0282148 A1 | * | 11/2008 | Xu ........................ | G06F 40/106 715/249 |
| 2013/0326398 A1 | * | 12/2013 | Zuverink .............. | G06F 3/0488 715/830 |

\* cited by examiner

*Primary Examiner* — Ting Z Lee
(74) *Attorney, Agent, or Firm* — Park, Vaughan, Fleming & Dowler LLP

(57) ABSTRACT

The system receives, from a client, a first request for a document which is parsed based on a syntax. The system parses and returns an initial number of lines of the document, thereby allowing the client to display the parsed initial number of lines in a visible window. Subsequent to successfully parsing a remainder of the lines, the system stores a fully-parsed version. Responsive to a scrolling action in the visible window, the system provides a relevant portion of an unparsed document associated with the first request. Responsive to detecting a termination of the scrolling action, the system receives a second request for parsed lines corresponding to a first set of lines. The system returns the corresponding parsed lines, thereby allowing the client to display the corresponding parsed lines in the visible window.

20 Claims, 9 Drawing Sheets

PERFORMANT RUN-TIME PARSING AND EDITING IN A CLIENT-SERVER MODEL

BACKGROUND

Field

This disclosure is generally related to the field of data management. More specifically, this disclosure is related to a method and system for facilitating performant run-time parsing and editing in a client-server model.

BRIEF DESCRIPTION OF THE FIGURES

In the figures, like reference numerals refer to the same figure elements.

DETAILED DESCRIPTION

Figure 1:
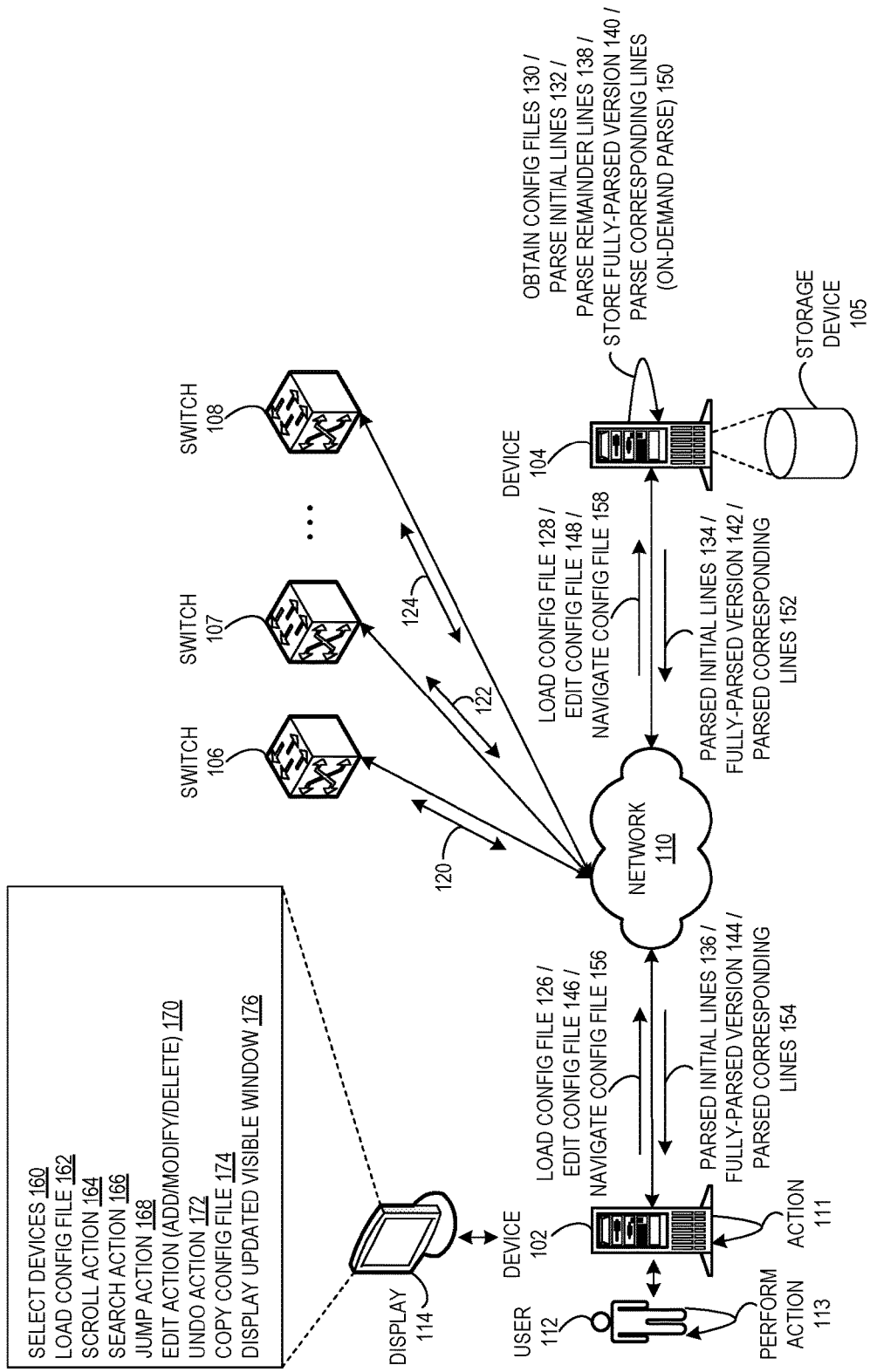
FIG. 1 illustrates a diagram with entities and communications which facilitate performant run-time parsing and editing in a client-server model, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A user (e.g., a network administrator) may view and edit network configuration files for multiple network devices via an interactive editor based on a client-server architecture. In such an architecture, the user, via a graphical user interface on a client display, can submit a request to view network configuration files for multiple network devices, and the server can parse the network configuration files based on a predetermined syntax. The user can also generate an edit (e.g., add, modify, delete) associated with a line or lines in the network configuration file and transmit the edit to the server. For example, the edit can be associated with multi-line operations, such as adding (pasting) twenty lines at once or deleting multiple lines by selecting a block and deleting the block. The server can respond to the view request by merging, processing, and parsing (hereinafter referred to as "parsing") the requested network configuration files using the syntax to obtain a fully-parsed version. The server can similarly respond to the edit request by parsing the network configuration file based on the edit to obtain an updated fully-parsed version. However, in such a client-server model, some challenges may exist. For example, a large network configuration file (e.g., 10,000 lines per file) may result in the server expending a significant amount of time to parse the network configuration file in order to obtain a similarly large parsed network configuration file. Furthermore, the transfer of such a large fully-parsed network configuration file between the client and the server may create a delay.

The described aspects of the present application provide a system which can provide improvements to the user experience of viewing and editing multiple large text-based network configuration files. The described aspects can use techniques such as windowing, delayed synchronization, and difference-based responses to more efficiently provide the parsed view via the graphical user interface to the user. The system can result in an improvement in response time, a reduction of computational cost, and a reduction in the consumption of network bandwidth. A diagram with entities and communications which facilitate performant run-time parsing and editing in a client-server model is described below in relation to FIG. 1.

The terms "network configuration file" and "configuration file" are used interchangeably in this disclosure and can refer to a document or file which stores, comprises, includes, or indicates settings related to configuring or used to configure one or more network devices. The term "network device" can refer to any computing device or entity which operates on or is associated with a network. In this disclosure, a network device can be associated with a network configuration file. Furthermore, while some of the aspects in this application describe a "network configuration file," the described aspects can apply to any document, file, set of documents, or set of files which are governed by or based on a syntax. That is, the terms "network configuration file" and "configuration file" are used as examples of documents or files which are parsed based on a syntax. Other documents may be used. For example, an underlying parsed document may include Java source code files which are edited in an integrated development environment (IDE), where the files comply with a certain syntax and where a user or system may wish to parse and view the files in an interlaced format to identify differences between the files.

Communications Which Facilitate Performant Run-Time Parsing and Editing in a Client-Server Model FIG. 1 illustrates a diagram 100 with entities and communications which facilitate performant run-time parsing and editing in a client-server model, in accordance with an aspect of the present application. Diagram 100 can indicate an environment, which includes: a device 102, an associated user 112, and an associated display screen 114; a device 104 and an associated or included storage device 105; and devices 106, 107, and 108 (e.g., switches). Devices 102, 104, and 106-108 can communicate with each other via a network 110. Device 102 can be a client computing device, e.g., a laptop computer, a mobile telephone, a smartphone, a tablet, a desktop computer, and a handheld device. Devices 102, 104, and 106-108 can be a computing device, e.g., a server, a networked entity, and a communication device. Devices 106-108 can be any network device which is associated with a configuration file, such as a server or a switch. In some aspects, devices 102 and 104 (and their associated operations) can run on the same device or within switches 106-108. Display 114 can include, indicate, or display various information to user 112 in a visible window of an editor, including actionable widgets and editing elements which can be activated or acted upon to send a command to device 104. That is, user 112 can perform an action 113 to activate any of the elements indicated in display 114. User 112 can include a human user or an "automated user", e.g., a program interacting with an application programming interface (API).

For example, user 112 may wish to view a configuration file for one or more devices. User 112 can select the devices (element 160) and perform action 113, e.g., to load a configuration ("config") file for switch 106 (element 162). Device 102 can send a load configuration file command 126 to device 104. Device 104 can receive command 126 (as a request or a load configuration file command 128). Device 104 can obtain configuration files (operation 130) for one or more devices (such as switches 106-108) either prior to or upon receiving request 128 (via communications 120, 122, and 124). Device 104 can process, parse, and merge (if necessary) "initial" lines of the configuration file (operation 132). The initial lines can be the lines of the parsed and merged configuration which are presented or displayed initially to the user, e.g., the lines which the user would expect to see initially on display 114 after performing action 113 via element 162 and prior to interacting with the displayed lines, as described below. Device 104 can send parsed initial lines 134 to device 102 while concurrently starting to process, parse, and merge the remainder of the lines of the configuration file (operation 138), e.g., as a background job. Device 102 can receive parsed initial lines 134 (as parsed initial lines 136) and perform an action 111 to display the parsed initial lines in the visible window (via an element 176). As a result, user 112 may more quickly obtain a displayed view of the parsed initial lines, because the remainder of the lines can be parsed and returned by device 104 while user 112 is viewing the initial lines.

At some point after device 104 begins operation 138 (concurrently parsing the remainder of the lines of the configuration file), once device 104 has successfully completed operation 138, device 104 can store a fully-parsed version of the configuration file (operation 140) to be accessed in response to subsequent requests or commands from device 102. Device 104 can return fully-parsed version 142 to device 102. Device 102 can receive fully-parsed version 142 (as a fully-parsed version 144), which allows device 102 to perform an action 111 to display any portion of the fully-parsed configuration file subsequently requested (e.g., navigated to) by user 112 and further allows user 112 to view the corresponding parsed lines in the visible window (element 176).

User 112 may wish to edit the configuration file, e.g., by adding, modifying, or deleting one or more lines, and can generate an edit (element 170). Device 102 can send the edit via an edit configuration file command 146 to device 104. Device 104 can determine and receive edit command 146 (as a request or an edit configuration file command 148). Device 104 can parse the configuration file based on the edit and return either the updated parsed configuration file (e.g., an entirely new parsed copy of the configuration file) or the updated parsed lines (e.g., a delta or difference from a prior copy received by the client, such as via an on-demand parse operation 150). Device 104 can return parsed corresponding lines 152 to device 102. Device 102 can receive parsed corresponding lines 152 (as parsed corresponding lines 154), which allows device 102 to perform an action 111 to display the parsed corresponding lines (via element 176).

User 112 may also wish to navigate through the configuration file, e.g., by performing a scroll action, search action, or jump action (via, respectively, elements 164, 166, and 168). For example, user 112 may navigate to a portion of the configuration file (whether via a scroll, search, or jump action). Device 102 can send to device 104 a corresponding command with a visible window identifier (e.g., a navigate configuration file command 156). Device 104 can receive the navigation command (via a request or a navigate configuration file command 158), determine the corresponding parsed lines based on the visible window identifier, and either return the corresponding parsed lines directly from the stored fully-parsed version (if successfully stored) or perform an on-demand parse of the corresponding lines (operation 150) and return the corresponding parsed lines. Thus, as above, device 104 can return parsed corresponding lines 152 to device 102. Device 102 can receive parsed corresponding lines 152 (as parsed corresponding lines 154), which allows device 102 to perform an action 111 to display the parsed corresponding lines (element 176). Each of the specific navigation actions (i.e., scroll, search, and jump) is described below in relation to FIGS. 2A and 2B.

User 112 can also perform an undo action (element 172) and receive a fully parsed copy of the configuration file, a difference from a prior copy, or a certain portion of the configuration file. User 112 can also request a copy of the configuration file (element 174). These operations are described below in relation to FIG. 2C.

Figure 2A:
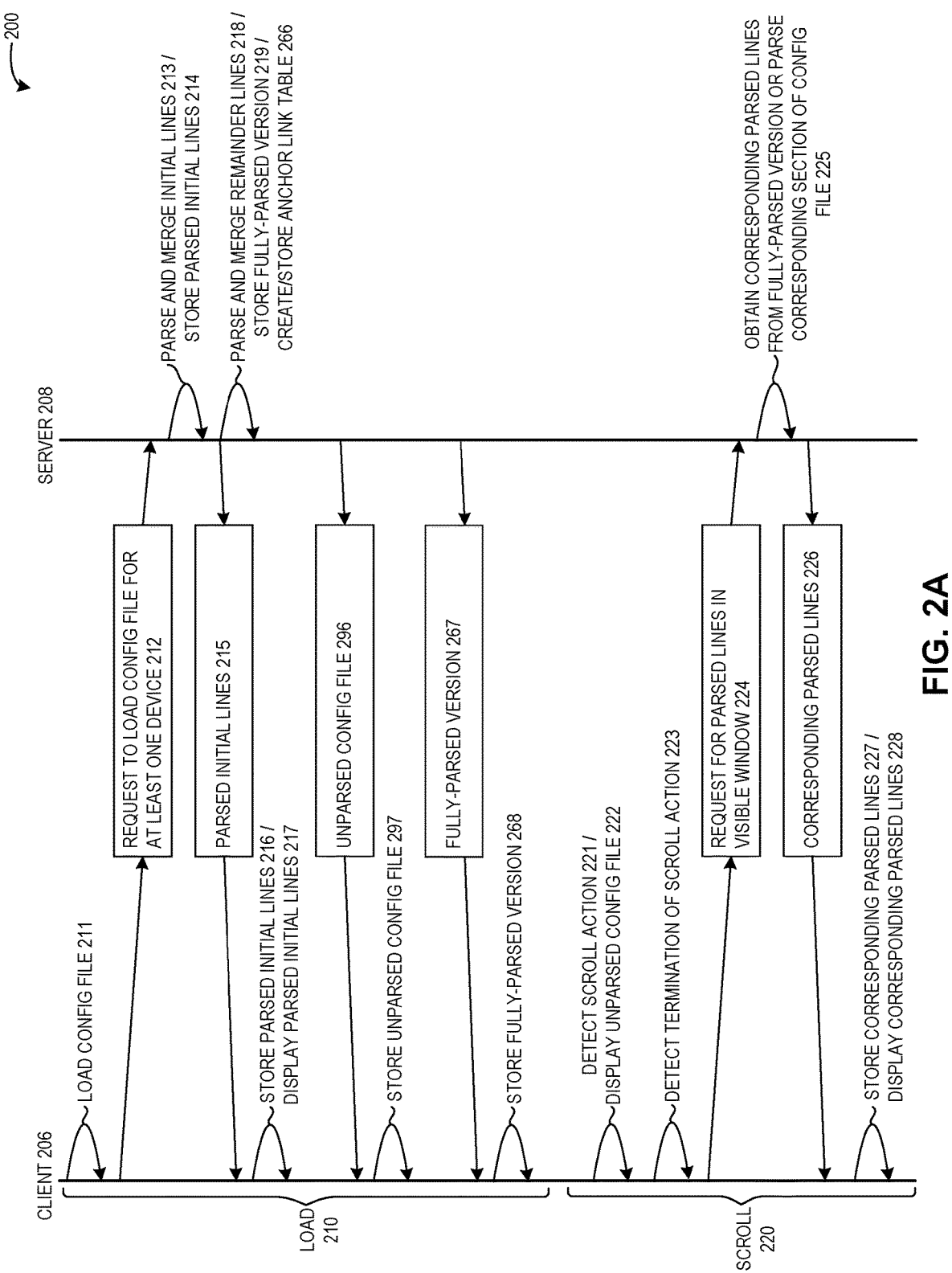
FIG. 2A illustrates communications which facilitate performant run-time parsing and editing in a client-server model, including load and scroll operations, in accordance with an aspect of the present application.
Figure 2B:
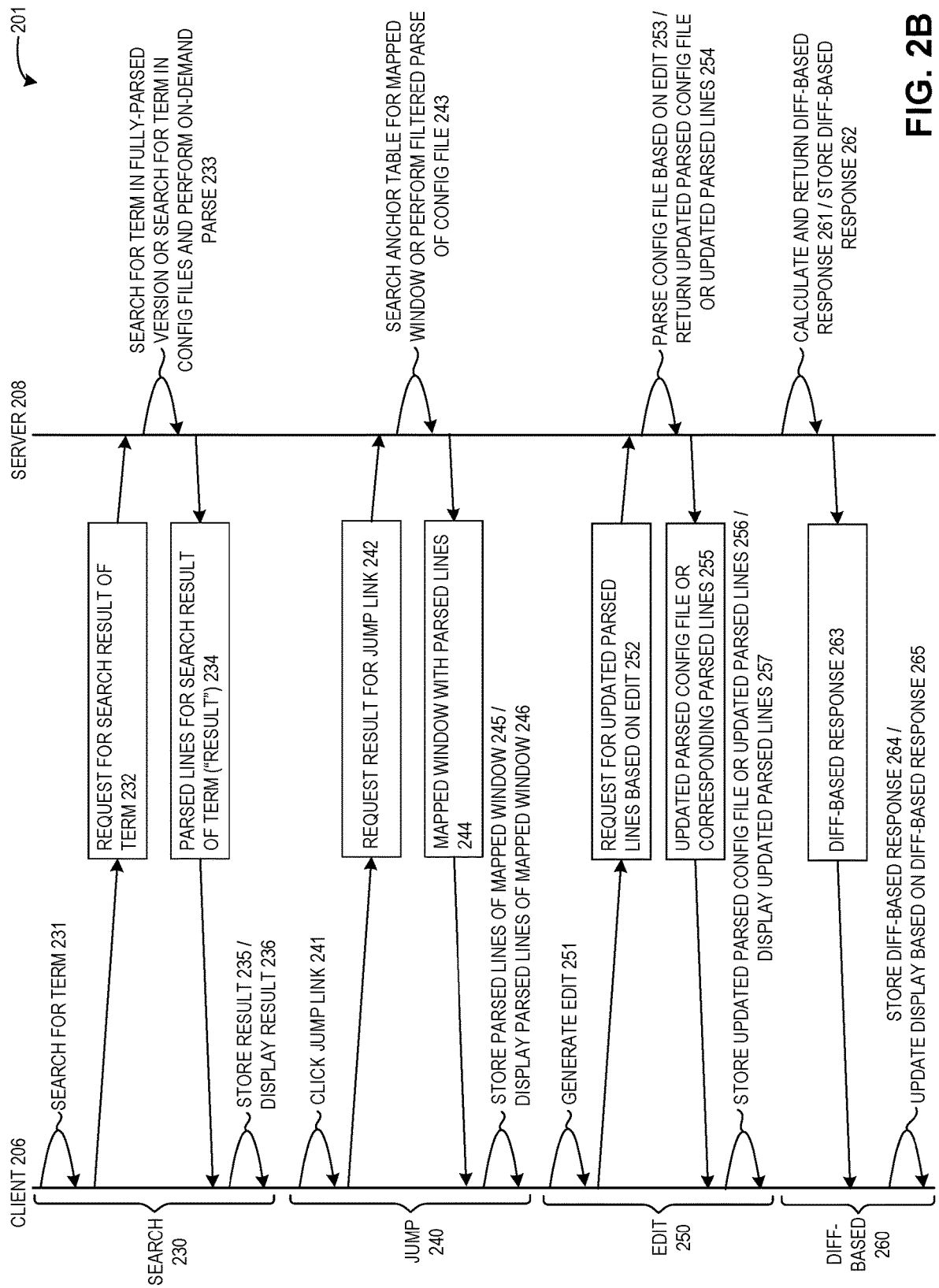
FIG. 2B illustrates communications which facilitate performant run-time parsing and editing in a client-server model, including search, jump, edit, and difference-based response operations, in accordance with an aspect of the present application.
Figure 2C:
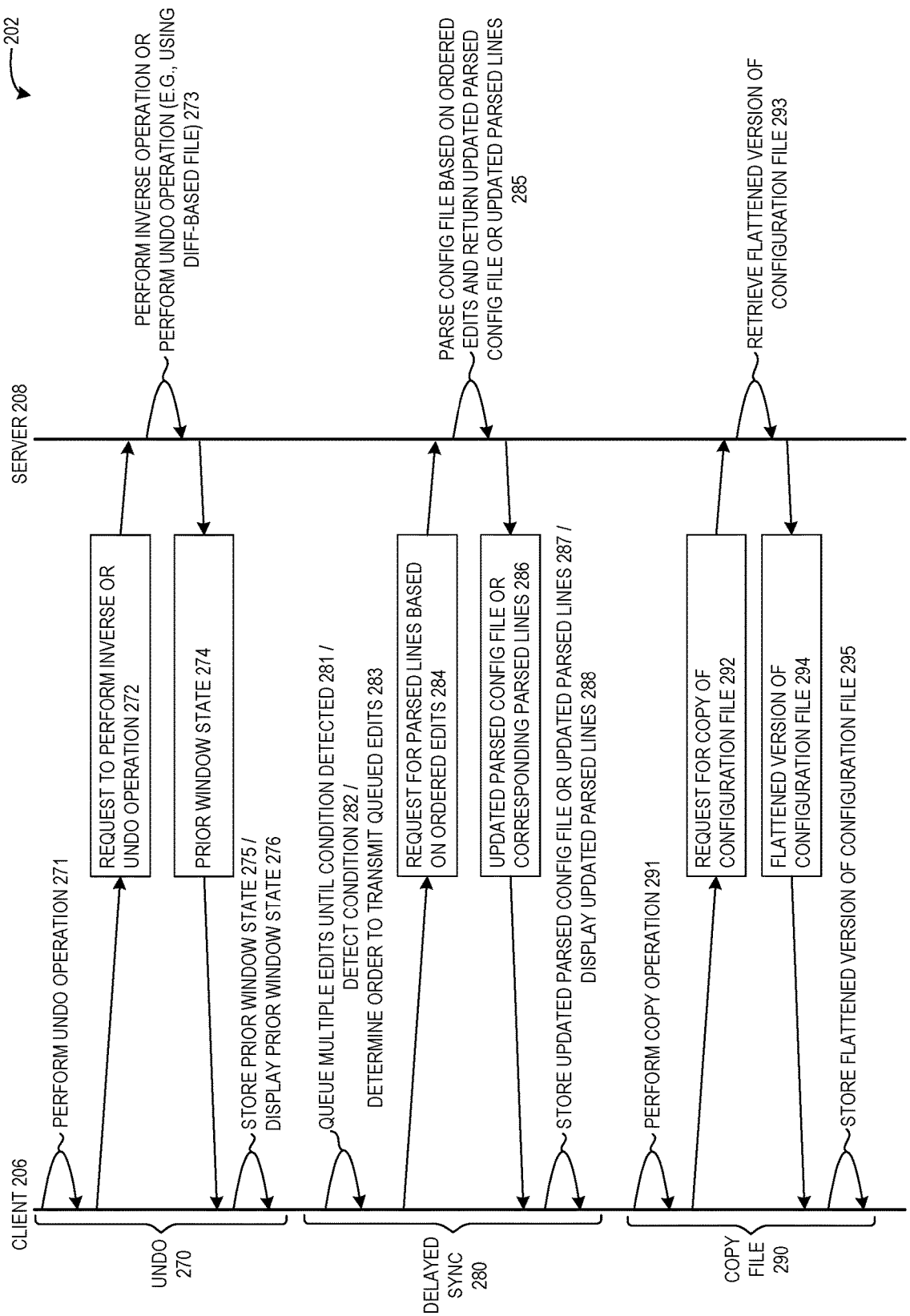
FIG. 2C illustrates communications which facilitate performant run-time parsing and editing in a client-server model, including undo, delayed synchronization, and copy file operations, in accordance with an aspect of the present application.

FIGS. 2A-2C depict communications between a client 206 and a server 208 which facilitate performant run-time parsing and editing, in accordance with an aspect of the present application. FIG. 2A illustrates communications 200 which facilitate performant run-time parsing and editing in a client-server model, including a load 210 operation and a scroll 220 operation, in accordance with an aspect of the present application. FIG. 2B illustrates communications 201 which facilitate performant run-time parsing and editing in a client-server model, including a search 230 operation, a jump 240 operation, an edit 250 operation, and a difference-based ("diff-based") response operation 260, in accordance with an aspect of the present application. FIG. 2C illustrates communications 202 which facilitate performant run-time parsing and editing in a client-server model, including an undo 270 operation, a delayed synchronization ("sync") 280 operation, and a copy file 290 operation, in accordance with an aspect of the present application.

Windowing

Given a 10,000-line configuration file, a user associated with client 206 may wish to edit the configuration file, but may only be viewing 50 lines of the configuration file in a visible window of a display of a client device. Instead of parsing the entire 10,000 lines at one time, client 206 can send a visible window identifier to server 208, which allows server 208 to parse and return only the lines corresponding to the visible window identifier. For example, if the user is only viewing lines 40-90 in the visible window, client 206 can generate and transmit a request for corresponding parsed lines from the configuration file, e.g., <start=40,end=90>. The system can use the visible window identifier in at least two scenarios: initial load and live editing.

Initial Load

As depicted in load 210 operation of FIG. 2A, the user may request to view a single configuration file, e.g., by performing a user action such as clicking on a "View" or "Load" button on a graphical user interface in an editor window of the display, which can result in client 206 performing a load configuration file operation 211. The initial load of a 10,000-line configuration file can result in a costly computational operation. Server 208 may retrieve the entire 10,000 lines, parse the lines, match each line based on a predetermined syntax (e.g., match each line to the appropriate line specification), and return the parsed result to client 206. The predetermined syntax can be based on line specifications, which can correlate to a specific command variant in a configuration file. A line specification can represent a line of a configuration file using a certain syntax or grammar and can specify the keywords, terms, and values which may appear for a given configuration command.

If the user requests to view multiple configuration files for multiple devices (e.g., by performing user actions on the display), server 208 may need to perform this same retrieval and parsing process for each configuration file and additionally merge the parsed configuration files before returning the parsed result to client 206. Client 206 can receive the parsed result as the response, and may build decorations for each line in the response. While these client and server operations occur, the user must wait for a response to the user action (e.g., the button click). Any improvements in response time can result in an improvement of the overall user experience.

When client 206 receives the parsed result as the response, client 206 can load and display the parsed result in a visible editor window of the display. Upon the initial load, the user will only be viewing a subset of all the lines of the configuration file, e.g., typically only the first N lines of the configuration file, where N is associated with an average number of lines displayed in the visible window. As a result, the described aspects can use a two-stage loading process. Client 206 can send to server 208 a request to load the configuration file for at least one device 212. In the first stage, server 208 can receive request 212 and retrieve, parse, and merge only the first N lines of each requested configuration file (parse and merge initial lines operation 213) and subsequently return the parsed first N lines to client 206 (parsed initial lines 215) to be displayed in the visible window. Server 208 can also store the parsed initial lines (operation 214). Because some lines may be filtered or collapsed in the visible window of the client editor, the system may load N+M lines, where M is the number of additional lines to load in anticipation of filtered/collapsed lines. In this case, N may be the actual number of lines displayed in the visible window (and is also still associated with the average number of lines displayed in the visible window). Client 206 can store and display the parsed initial lines (operations 216 and 217). In some aspects, server 208 can return an unparsed configuration file 296 and client 206 can store the unparsed configuration file (operation 297). The unparsed configuration file can be associated with a single switch and, in the case of multiple configuration files, can be selected randomly or based on a characteristic of the multiple configuration files, e.g., the longest configuration file. The unparsed configuration file can be sent as a separate response (as shown in 296) or can be sent as part of the parsed initial lines 215.

In the second stage, which can be performed in parallel with the first stage, server 208 can initiate a background job which performs the same process for the remainder of the lines of the configuration file (or for the entire configuration file) (parse and merge remainder lines operation 218). Server 208 can also store the fully-parsed version (operation 219) and return fully-parsed version 267 to client 206. After storing the fully-parsed version of the configuration file (operation 219), server 208 can also create and store an anchor link table (operation 266), which can be used in a subsequent jump action, as described below in relation to jump 240 operation of FIG. 2B.

Client 206 can receive and store the fully-parsed version (operation 268). While this background job (218) may take longer to complete than the initial parse of the first N lines (213), the system can replace the incomplete initial result (initial response of the parsed first N lines) from the first stage with the complete result (fully-parsed version) from the second stage. This allows client 206 to receive the initial response (215) in a shorter amount of time than receiving the fully-parsed version of the second response (267), which can result in improving the user experience. By the time the user begins to interact with the first response (e.g., by clicking, navigating, scrolling, searching, etc.), client 206 is more than likely to have received the second response. In some aspects, the system can provide an optimization in which the second stage omits the first N lines which were included in the first stage.

In practice, the difference between the response time for the first stage and the second stage may be on the order of several seconds. During this period, the user may wish to scroll down and view other portions of the document. In some aspects, the system can extend the two-stage loading process to a three-stage, four-stage, or Y-stage loading process, in which each stage can load and parse a proportionally larger percentage of lines in the document. The system can determine the number of stages based on the size of the document, a default setting, or a user-configured setting. For example, a document with greater than 20,000 lines may use a 4-stage loading process, while a document with less than 5,000 lines may use a 2-stage loading process.

Live Editing: Navigation (Scrolling, Searching, and Jumping) and Undo Operations After loading the configuration file, the user may wish to edit the configuration file, e.g., by adding, modifying, or deleting a line (a "single edit") or lines ("multiple edits") in the configuration file. As depicted in edit 250 operation of FIG. 2B, the user can generate a first edit associated with a line of a set of lines in the visible window, which can result in client 206 performing a generate edit operation 251. The system or client 206 can generate, based on the first edit, a request for updated parsed lines (or an updated fully-parsed configuration file) from server 208 (request for updated parsed lines based on edit 252). Server 208 can receive request 252, parse the configuration file based on the first edit (operation 253), and return the updated fully-parsed configuration file or the updated parsed lines corresponding to the visible set of lines (operation 254). In some aspects, the system or server 208 may return only the updated parsed lines corresponding to the visible set of lines, rather than returning the updated fully-parsed configuration file. This can result in a reduction in the response time, which in turn can result in an improvement of the overall user experience. Client 206 can receive updated parsed configuration file or corresponding parsed lines 255, store the updated parsed configuration file or corresponding parsed lines (operation 256), and display the updated parsed lines (operation 257).

The user may wish to navigate to another part of the document, e.g., by scrolling, searching, or clicking on a jump or anchor link. In some aspects, client 206 can estimate the location of the visible window within the document and transmit a request to server 208 for the portion of the parsed configuration file corresponding to the visible window (e.g., by estimating the visible window identifier). Server 208 can either reparse the requested portion of the configuration file or, if the configuration file (or the requested portion) has been fully parsed and stored/cached by server 208, return the stored/cached parsed portion.

Scrolling. As depicted in scroll 220 operation of FIG. 2A, in viewing or navigating a given configuration file, the user may scroll to a new location in the configuration file. During the time of physically or actively scrolling to the new location, the user generally is not looking at details on each line. Instead, the user may be scanning the general document structure and looking for keywords or placeholders which indicate whether the user has arrived at the desired section of the document. For example, when scrolling through a configuration file to edit "interface 1/1/22," the user may scroll past lines which precede the interface block, such as lines involving Simple Network Management Protocol (SNMP) or virtual routing and forwarding (VRF). The user may reach lines which follow the interface block, such as lines involving routing protocols, and determine to terminate or stop scrolling and begin moving in reverse or backwards in the document. As a result, when the system detects a scrolling action by the user, i.e., during the time that the user is scrolling (operation 221), the described aspects can present an unparsed copy of a configuration file for a single switch (e.g., the unparsed configuration file 296 which is stored in operation 297) or a relevant or estimated portion of the unparsed copy (display unparsed configuration file operation 222).

When the system detects a termination of the scrolling action by the user, i.e., when the user stops scrolling (operation 223), client 206 can generate and send a request to the server for the parsed section in the visible window (request for parsed lines in visible window 224). Server 208 can receive request 224. If the fully-parsed version is stored or available to the server, server 208 can obtain and return the corresponding parsed lines from the fully-parsed version (operation 225 and corresponding parsed lines 226). If the full parsed version is not stored or available to server 208, server 208 can parse the section of the configuration file corresponding to the lines in the visible window (operation 225) and can further return the parsed section as the corresponding parsed lines (corresponding parsed lines 226). Client 206 can store and display the corresponding parsed lines (operations 227 and 228).

Furthermore, the user may scroll by a large amount in a short period of time, and the system may detect an amount of scrolling during a predetermined time window. In such a scenario, client 206 can generate a request for parsed lines corresponding to an estimated visible window. Client 206 can estimate the visible window based on, e.g.: a speed of scrolling based on the amount of scrolling during the predetermined time window; and an estimation of a percentage of the file or document which is scrolled through during the predetermined time window. Using the estimated visible window, client 206 may transmit to server 208 the request for parsed lines corresponding to the estimated visible window.

Searching. As depicted in search 230 operation of FIG. 2B, while viewing or navigating a given configuration file, the user may search for a term in the document (operation 231). If client 206 has received and stored/cached the fully-parsed version, client 206 can simply search the cached copy and display the relevant portion (operation 236). If client 206 has not received and stored/cached the fully-parsed version, client 206 can generate and send a request to server 208 for the first match in the fully-parsed version (e.g., to obtain first search results) (request for search result of term 232). Server 208 can receive request 232. If the fully-parsed version is stored or available to server 208, server 208 can search the fully-parsed version and return the parsed lines corresponding to the first hit from the fully-parsed version (as the first search results) (operation 233 and parsed lines for result 234). If the fully-parsed version is not stored or available to server 208, server 208 can search the configuration files for the first hit and perform an on-demand parse of the lines corresponding to the first hit (operation 233), and can further return the parsed lines corresponding to the first hit (as the first search results) (parsed lines for result 234). Client 206 can receive result 234 and can store and display the result (operations 235 and 236).

In some aspects, when the fully-parsed version is not available, client 206 may cache the first search results as well as subsequent search results so that navigating back and forth between hits for the term (i.e., search results) may be performed more efficiently than parsing the entire document.

Jumping. As depicted in jump 240 operation of FIG. 2B, while viewing or navigating the given configuration file, the user may jump to a different location in the same or another document by clicking a link (e.g., a reference, an anchor, a jump link or an anchor link associated with a line or lines). The system may correlate a line or lines in one configuration file with an anchor in another configuration file (e.g., as a reference to an Internet Protocol (IP) address of another switch). Client 206 can send a reference to server 208 (click jump link operation 241) and request the parsed lines in the window corresponding to the reference (request result for jump link 242). Server 208 can receive request 242. Server 208 may use a pre-calculated lookup table (as created in operation 266) which maps a given reference to the window or set of lines that most efficiently displays the anchor. Server 208 can search the lookup table for the given reference (operation 243) and return the mapped window to client 206 (mapped window with parsed lines 244). Client 206 can receive the mapped window and can further store and display the mapped window with parsed lines in the different location in the same or another document (operations 245 and 246).

In general, server 208 must have access to an available or stored/cached copy of the fully-parsed version in order to pre-calculate the lookup table, as described above in relation to operations 218, 219, and 266. In some aspects, if the fully-parsed version is not available or stored/cached, server 208 can use pre-calculated regular expressions which translate the jump link or reference into a search.

Furthermore, the jump link may be similar to a table of contents or "chapter entries" feature. To create such table of content or chapter entries, the system need not include the lowest level of lines (i.e., the most indented lines in the hierarchy of lines of the configuration file), because the desired jump information generally appears at the higher levels. Server 208 may perform a more efficient parse of the anchor points, via a pre-parse or filtered parse of the document or documents, in which the system can remove or filter out the lowest level of lines of the documents and parse only the remainder of the document or documents in order to identify the anchors (operation 243). For example, the system may omit parsing of lines (or filter out lines prior to parsing) which begin with a certain number of spaces, such as two or four spaces.

Undo. As depicted in undo 270 operation of FIG. 2C, after performing an edit operation, the user may wish to undo the edit operation. Client 206 can either generate and request the inverse of the edit operation from server 208 or request that server 208 perform an undo operation (perform undo operation 271 and request to perform inverse or undo operation 272). In some cases, client 206 may not have knowledge of all the information needed to construct the inverse operation, in which case, client 206 can send a request to server 208 to perform an undo operation (request 272). Server 208 can receive request 272. Server 208 can calculate the new state of the document by performing an inverse operation or an undo operation, e.g., using difference-based files, as described below (operation 273). This may occur, for example: when the user pastes several lines which may become mixed into various sections of the documents, in which case, client 206 may not have seen the lines which were modified outside of the visible window; and when the user inserts a new line which may become combined with an existing line, in which case, client 206 may not have recorded the prior state of the combined lines. Server 208 can return the configuration file or visible parsed lines corresponding to the prior window state (prior window state 274) to client 206. Client 206 can store and display the prior window state as the visible parsed lines (operations 275 and 276).

As described in copy file 290 operation of FIG. 2C, in some aspects, the user may copy the entire configuration file from the editing window, which can result in client 206 performing copy operation 291. Client 206 may send a request to the server for a flattened version of the entire document (request for copy of configuration file 292). Server 208 can receive request 292, retrieve a flattened version of the configuration file (operation 293), and return in its response the flattened version of the configuration file (a flattened version 294). Client 206 can receive and store the flattened version of the configuration file (operation 295).

Delayed Synchronization

The above-described operations can involve an iterative feedback loop in which the user/client 206 allows and generates a single edit, transmits the single edit to server 208, and waits for server 208 to respond before allowing and generating further edits. In some aspects, the system may provide a delayed synchronization between client 206 and server 208, in which client 206 can allow and generate multiple edits. Client 206 can store these multiple edits in a queue of client 206, and subsequently replay the multiple edits to server 208. Client 206 can store the multiple edits in the queue until client 206 detects a condition (operation 281), and can replay the edits to server 208 upon detection of the condition. The condition can include: determining a delay in user activity which is greater than a predetermined time (e.g., based on a period of time since a most recent user action via the graphical user interface); detecting that the user has generated a specific synchronization command via the graphical user interface (e.g., based on a user action such as clicking a "Synchronization" button); detecting that the user is editing a section of the configuration file which is greater than a predetermined number of lines apart from the plurality of edits associated with the plurality of lines (e.g., based on a user action via the graphical user interface in a new context or area of the configuration file or based on a relative size of the configuration file); and determining that a length of the queue is greater than a predetermined size (e.g., based on how many multiple edits are generated by the user). Some of these conditions may include or be based on a quantitative value, such as the length of the user delay or the size of the client queue. The system can dynamically tune the quantitative value based on, e.g., the length of the configuration file. For example, large documents may take longer to parse and update, so the system may dynamically increase the quantitative conditional values for larger documents.

When client 206 detects the condition (operation 282), client 206 can determine an order in which to transmit the edits to the server (operation 283), based on, e.g.: an order of the plurality of edits as entered by the user; an order of the plurality of edits based on an order in which the edits occur in the configuration file; all add actions as a single bulk paste operation; and all delete operations as a single bulk delete operation. Client 206 can generate and send a request to server 208 for updated parsed lines (request for parsed lines based on ordered edits 284). Server 208 can receive request 284, parse the configuration file based on the ordered edits, and return the updated parsed configuration file or updated parsed lines (operation 285 and updated parsed configuration file or corresponding parsed lines 286). Client 206 can receive updated parsed configuration file or updated parsed lines 286, store the updated parsed configuration file or updated parsed lines (operation 287), and display the updated parsed lines (operation 288).

Because client 206 is already grammar-aware (e.g., has knowledge of line specifications), client 206 can match typed lines to the line specifications. Client 206 can sort the lines to a location in the document which is in close proximity to where server 208 would sort the lines. Client 206 can also allow the user to edit per-document values before sending the edits to server 208.

Difference-Based Response

As described herein, the described system can return a fully-parsed version of the configuration file (e.g., 267 and 255) to client 206, and client 206 can receive, store (e.g., 268), and navigate to any portion of the fully-parsed version (e.g., scroll 220, search 230, and jump 240). However, in the instance of a single edit or a small number of edits, the majority of the lines in the configuration file remain unchanged, relative to other lines. Sending the entire file across when only single line or a few number of lines have changed may unnecessarily consume both computing and network resources.

As depicted in edit 250 and difference-based 260 operations of FIG. 2B, subsequent to parsing a configuration file based on one or more edits (operation 253), server 208 can calculate, return, and store a difference-based response (operations 261 and 262), either in addition to or in place of operation 254. Client 206 can receive and stored the difference-based response (difference-based response 263 and operation 264). Client 206 can also update the display based on the difference-based response (operation 265).

Instead of parsing and returning the updated parsed lines or the fully-parsed version (as in operation 253), server 208 can calculate the difference between the pre-edit and the post-edit state of the configuration and return the calculated difference to client 206 (operation 261). Server 208 can also store the calculated difference (operation 262). The pre-edit state can be a first state which corresponds to the state of the configuration file prior to the one or more edits, and the post-edit state can be a second state which corresponds to the state of the configuration file subsequent to the one or more edits. Server 208 may store a record of the calculated difference and use the stored record of the calculated difference to revert to a prior state, e.g., if requested by the client to perform an undo operation.

Upon receiving the calculated difference (as difference-based response 263), client 206 can determine, based on the visible lines and the calculated difference or difference-based response 263, the updated parsed lines. Thus, client 206 can update its own version and display of the parsed lines by using the calculated difference as a "recipe" of changes. This can result in the reduction of data being sent from server 208 to client 206 and can further reduce the consumption of network resources. While the "calculated difference" (as calculated by server 208) and the "difference-based response" (as returned to and received by client 206) may be logically related, in some aspects, different formats may be used for the calculated difference and the difference-based response. For example, the calculated difference may include implementation-internal information which may not be present in the difference-based response, and the difference-based response may include request identifiers or other communication or protocol-related information which may not be present in the calculated difference.

Visible Editor Window with Requested Configuration File

Figure 3:
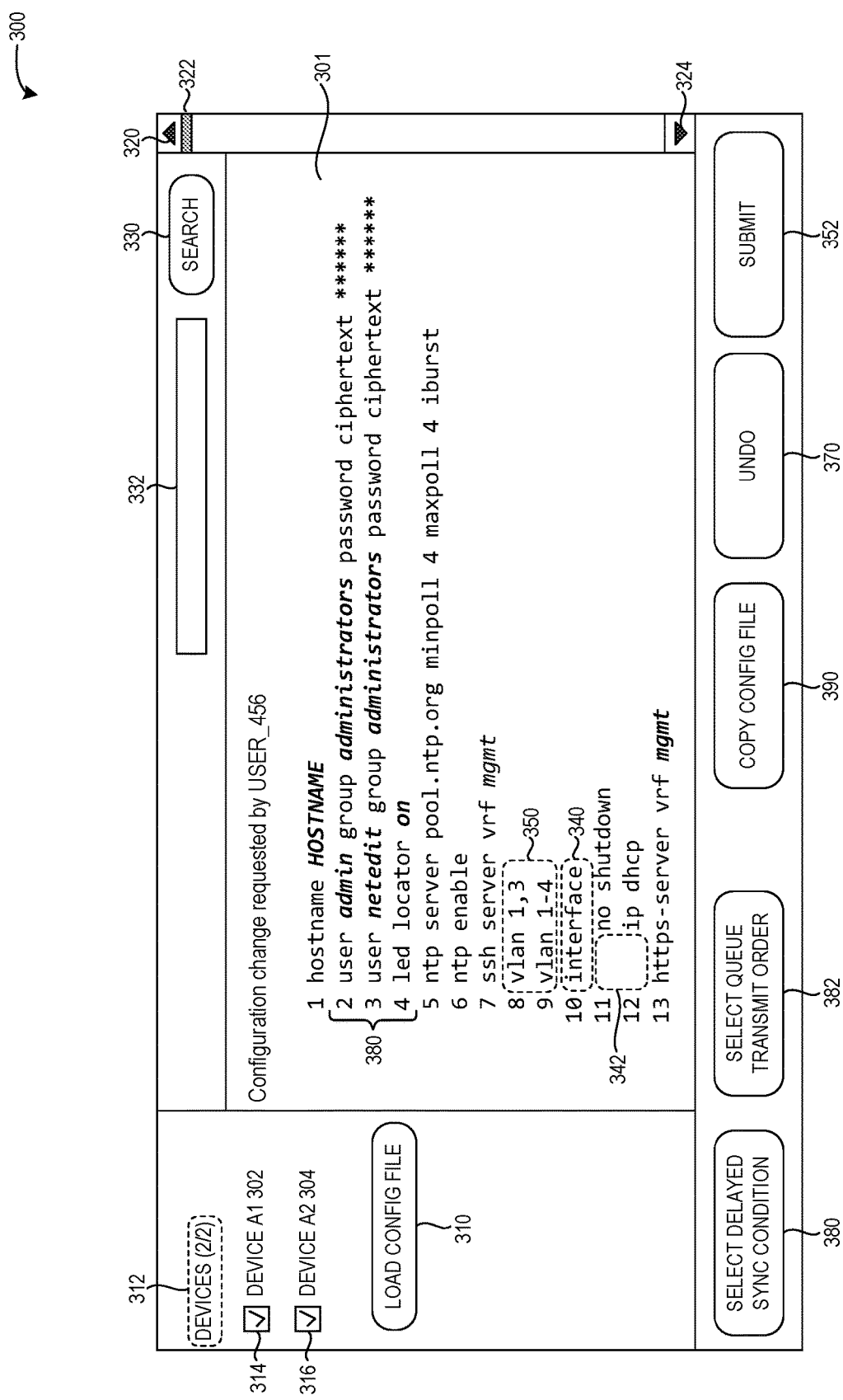
FIG. 3 illustrates a visible editor window with a requested configuration file, in accordance with an aspect of the present application.

FIG. 3 illustrates a diagram 300 with a visible editor window 301, in accordance with an aspect of the present application. Diagram 300 can correspond to display 114 of FIG. 1 and can include various actionable widget and editing elements for a user of a client device. Diagram 300 can include an area in which the user can load a configuration file (element 310) by selecting one or more devices (elements 314 and 316) and can also display the number of devices selected out of the total devices available (element 312). The user request to load the configuration file for the two selected devices can result in the operations described above for load 210 of FIG. 2A.

The system can load the initial lines into a visible window editor 301 (e.g., visible lines 1-13). The user may edit and navigate through the loaded configuration file, as well as perform other actions. For example, the user may navigate by scrolling (via elements 320, 322, and 324 or other keyboard input), which results in the operations described above for scroll 220 of FIG. 2A. The user may also perform a search operation by typing in a term in a search box (element 332) and clicking on a search button (element 330), which results in the operations described above for search 230 of FIG. 2B.

Certain text may be highlighted or displayed to indicate a clickable jump link. For example, text 340 may include the term "interface" with an underline or other indicator such as color or a changing font on a mouse-over (element 340). The user may further navigate by clicking on element 340, and the system may update visible window editor 301 to display a previously mapped window for the reference in element 340, as described above for jump 240 of FIG. 2B.

The user may edit one or more lines in the displayed visible window, e.g., by inserting a line 8 before line 9 (element 350). To send the request for updated parsed lines to the server once the user has finished the edit, the user may either click a submit button (element 352) or the system may automatically generate the request for the updated parsed lines based on another user action, such as pressing "enter" or "tab" on the keyboard after editing the line, which results in the operations described above for edit 250 of FIG. 2B.

The user may also undo a prior edit by selecting an undo button (element 370), which results in the operations described above for undo 270 of FIG. 2C. The user may copy the configuration file (and receive a flattened copy of the configuration file) by selecting a copy config file button (element 390), which results in the operations described above for copy file 290 of FIG. 2C.

Furthermore, the user may perform multiple edits (as in multiple lines 380) and the system can perform a delayed synchronization operation, as in the operations described above for delayed sync 280 of FIG. 2C. In some aspects, the user may select the delayed synchronization condition (element 380), i.e., the condition which triggers the multiple edits in the queue to be transmitted to the server. The user may also select the order in which the multiple edits in the queue are to be transmitted to the server (element 382). In some aspects, the system (e.g., client 206 or software running on client 206) may determine the order in which the multiple queued edits are transmitted. The system may also determine the condition and order based on a pre-defined user setting, a system setting, or a default setting.

Figure 4A:
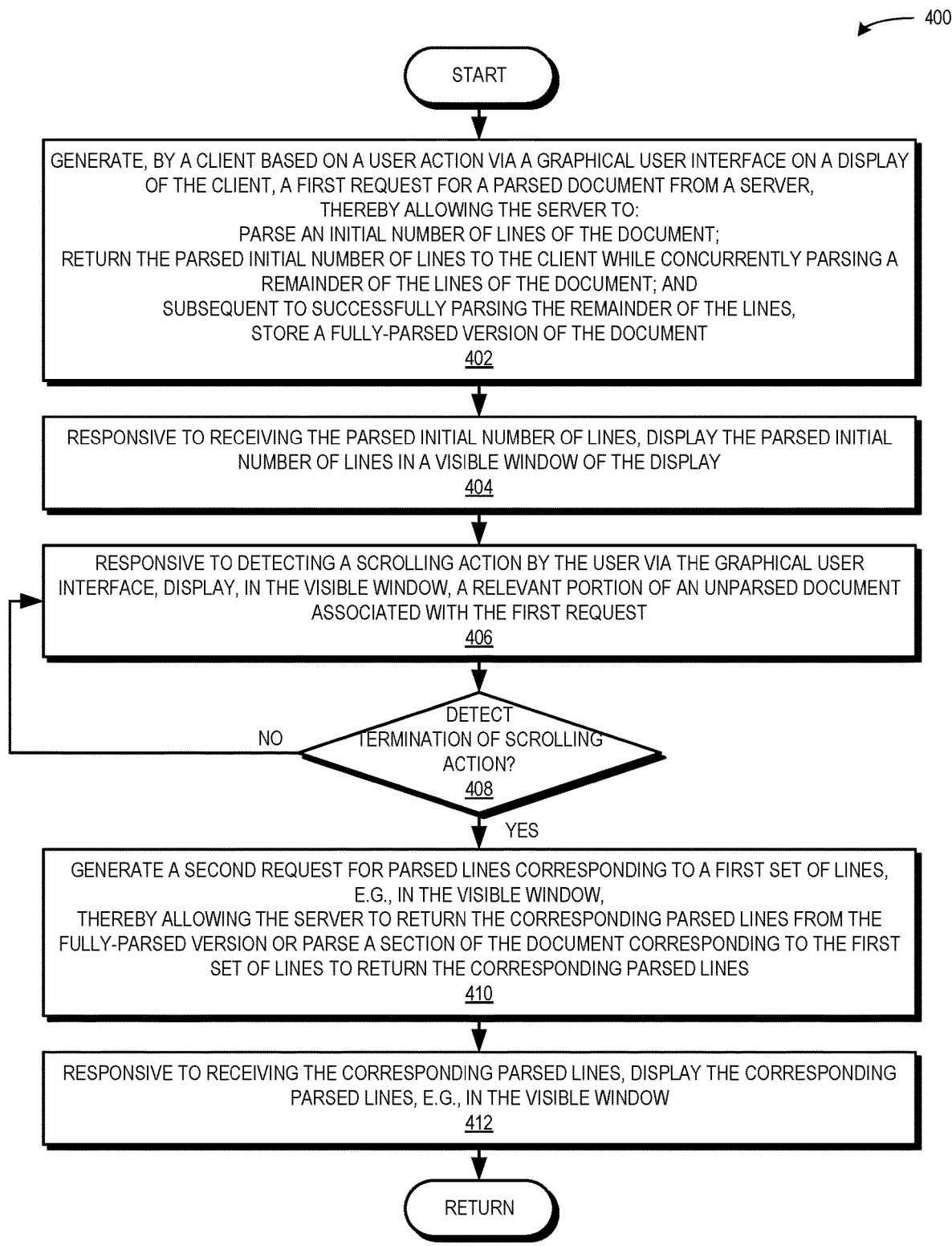
FIG. 4A presents a flowchart illustrating a method which facilitates performant run-time parsing and editing in a client-server model, including operations of a client, in accordance with an aspect of the present application.

Methods for Facilitating Performant Run-Time Parsing and Editing in a Client-Server Model FIG. 4A presents a flowchart 400 illustrating a method which facilitates performant run-time parsing and editing in a client-server model, including operations of a client, in accordance with an aspect of the present application. During operation, the system generates, by a client based on a user action via a graphical user interface on a display of the client, a first request for a parsed document from a server, thereby allowing the server to: parse an initial number of lines of the document; return the parsed initial number of lines to the client while concurrently parsing a remainder of the lines of the document; and, subsequent to successfully parsing the remainder of the lines, store a fully-parsed version of the document (operation 402). Responsive to receiving the parsed initial number of lines, the system displays the parsed initial number of lines in a visible window of the display (operation 404). Responsive to detecting a scrolling action by the user via the graphical user interface, the system displays, in the visible window, a relevant portion of an unparsed document associated with the first request (operation 406). If the system does not detect a termination of the scrolling action (decision 408), the operation continues at operation 406.

If the system detects a termination of the scrolling action (decision 408), the system generates a second request for parsed lines corresponding to a first set of lines, e.g., in the visible window, thereby allowing the server to return the corresponding parsed lines from the fully-parsed version or parse a section of the document corresponding to the first set of lines to return the corresponding parsed lines (operation 410). Responsive to receiving the corresponding parsed lines, the system displays the corresponding parsed lines, e.g., in the visible window (operation 412) and the operation returns.

Figure 4B:
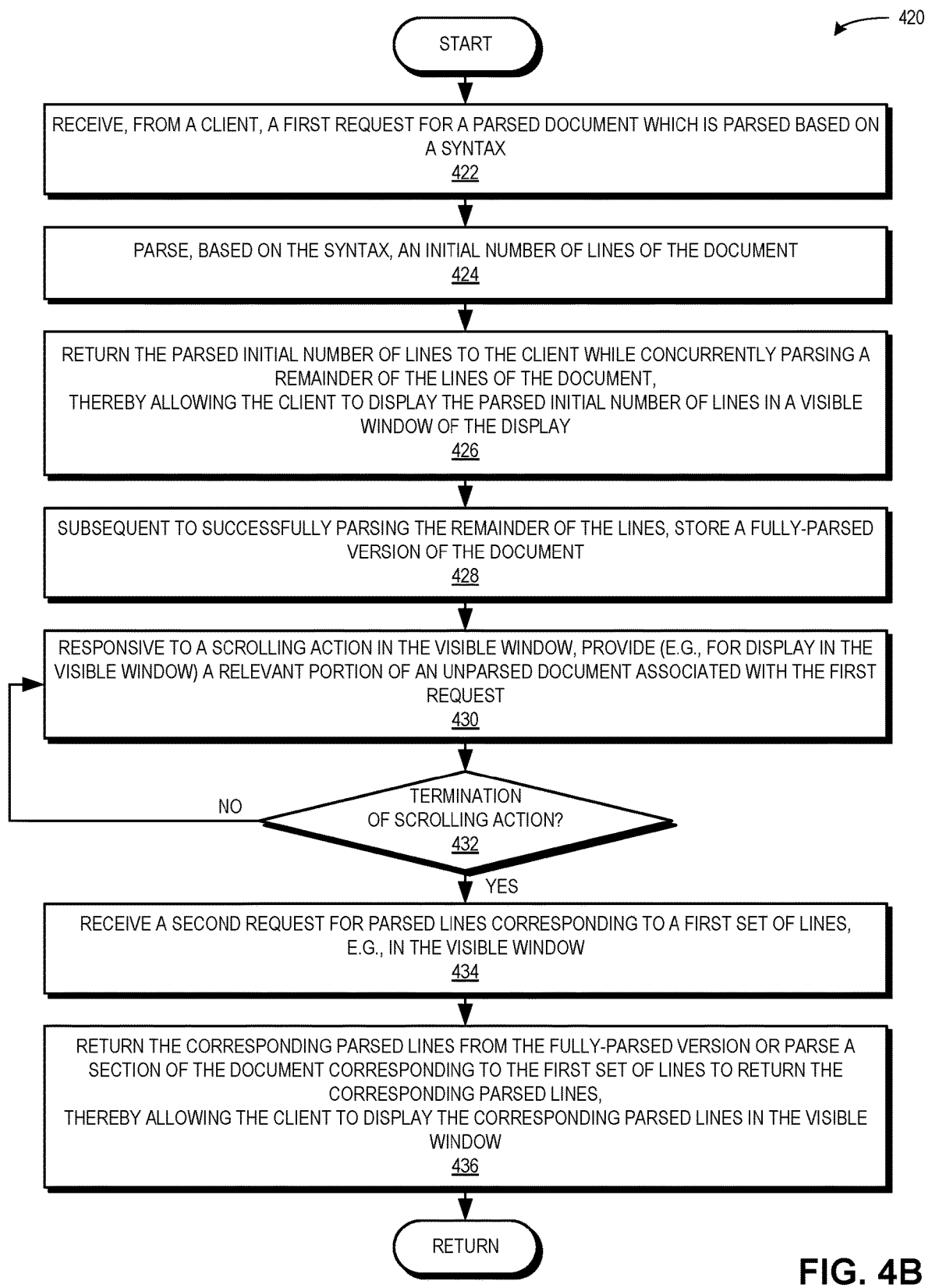
FIG. 4B presents a flowchart illustrating a method which facilitates performant run-time parsing and editing in a client-server model, including operations of a server, in accordance with an aspect of the present application.

FIG. 4B presents a flowchart 420 illustrating a method which facilitates performant run-time parsing and editing in a client-server model, including operations of a server, in accordance with an aspect of the present application. During operation, the system receives, from a client, a first request for a document which is parsed based on a syntax (operation 422). As described above in relation to user 112 of FIG. 1, the first request (and other user or client requests) can be initiated by a human user, e.g., via an editor or a graphical user interface (GUI) on a client or client display, or by an automated user, e.g., via an API by a program, which allows for both human and programmatic control. Furthermore, the document can be a network configuration file, and the editor or GUI can run on a client which manages configuration of network devices by editing network configuration files. The system parses, based on the syntax, an initial number of lines of the document (operation 424). The system returns the parsed initial number of lines to the client while concurrently parsing a remainder of the lines of the document, thereby allowing the client to display the parsed initial number of lines in a visible window of the display (operation 426). Subsequent to successfully parsing the remainder of the lines, the system stores a fully-parsed version of the document (operation 428).

Responsive to a scrolling action in the visible window, the system provides (e.g., for display in the visible window) a relevant portion of an unparsed document associated with the first request (operation 430). If the system does not detect a termination of the scrolling action (decision 432), the operation continues at operation 430. If the system does detect a termination of the scrolling action (decision 432), the system receives a second request for parsed lines corresponding to a first set of lines, e.g., in the visible window (operation 434). The system returns the corresponding parsed lines from the fully-parsed version or parses a section of the document corresponding to the first set of lines to return the corresponding parsed lines, thereby allowing the client to display the corresponding parsed lines in the visible window (operation 436). The operation returns. While not depicted in FIGS. 4A and 4B, the described embodiments can include methods which perform the operations described above in relation to FIGS. 1, 2A, 2B, and 2C.

Computer System and Apparatus

Figure 5:
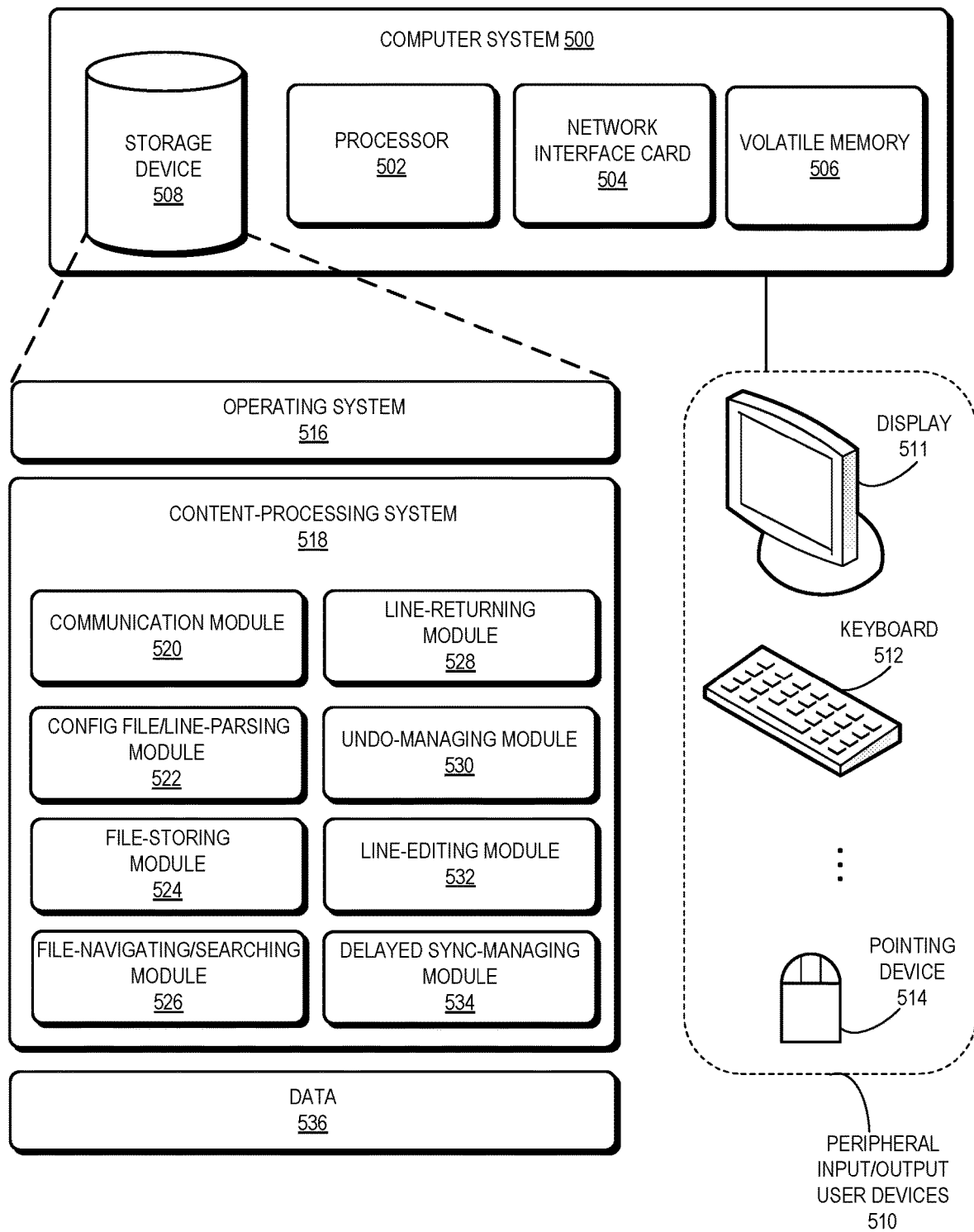
FIG. 5 illustrates a computer system which facilitates performant run-time parsing and editing in a client-server model, in accordance with an aspect of the present application.

FIG. 5 illustrates a computer system which facilitates performant run-time parsing and editing in a client-server model, in accordance with an aspect of the present application. Computer system 500 includes a processor 502, a network interface card (NIC) 504, a volatile memory 506, and a storage device 508. NIC 504 can facilitate communication with other systems by connecting computer system 500 to other networks. Volatile memory 506 can include, e.g., random access memory (RAM), that serves as a managed memory, and can be used to store one or more memory pools. Storage device 508 can include persistent storage which can be managed or accessed via processor 502. Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536. Computer system 500 may include fewer or more modules than those shown in FIG. 5, and can be associated with a server such as device 104 in FIG. 1 or server 208 in FIGS. 2A-2C.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets, and instructions relating to configuration files, requests, and commands (communication module 520).

Content-processing system 518 can further include instructions for receiving, from a client, a first request for a parsed document which is parsed based on a syntax (communication module 520). Content-processing system 518 can include instructions for parsing, based on the syntax, an initial number of lines of the document (configuration file/line-parsing module 522). Content-processing system 518 can include instructions for returning the parsed initial number of lines to the client (line-returning module 528) while concurrently parsing a remainder of the lines of the document (configuration file/line-parsing module 522), thereby allowing the client to display the parsed initial number of lines in a visible window of the display. Content-processing system 518 can include instructions for, subsequent to successfully parsing the remainder of the lines (configuration file/line-parsing module 522), storing a fully-parsed version of the document (file-storing module 524). Content-processing system 518 can also include instructions for, responsive to a scrolling action in the visible window (file-navigating/searching module 526), providing a relevant portion of an unparsed document associated with the first request (line-returning module 528). Content-processing system 518 can include instructions for, responsive to detecting a termination of the scrolling action (file-navigating/searching module 526), receiving a second request for parsed lines corresponding to a first set of lines (communication module 520). Content-processing system 518 can further include instructions for returning the corresponding parsed lines from the fully-parsed version (line-returning module 528) or parsing a section of the document corresponding to the first set of lines to return the corresponding parsed lines (configuration file/line-parsing module 522), thereby allowing the client to display the corresponding parsed lines in the visible window.

Content-processing system 518 can additionally include instructions for responding to: the navigating operations of scroll 220, search 230, and jump 240 (file-navigating/searching module 526); the operations of edit 250 (file-editing module 528); the undo operations of undo 270 (undo-managing module 530); the delayed synchronization operations of delayed sync 280 (delayed sync-managing module 534); and the copy operations of copy file 290 (communication module 520).

Data 536 can include any data that is required as input or generated as output by the methods and/or processes described in this disclosure. Specifically, data 536 can store at least: a syntax; a line; a modified or unmodified line; a line specification; a request; a term; a value; a default value; a keyword; a document; a file; a configuration; a configuration file; an unparsed copy or version of a document, file, or configuration file; a fully-parsed copy or version of a document, file, or configuration file; parsed lines; a parsed section of a document, file, or configuration file; an initial number; a number of stages; a visible window identifier; an indicator of a visible window; an indicator of a navigate, scroll, search, jump, undo, edit, copy, or delayed synchronization operation; an indicator of whether the fully-parsed version is available or stored; a predetermined time window; a speed of scrolling; an amount of scrolling during the predetermined time window; an estimation; a percentage; one or more edits to a line or lines; a set of lines; a queue; multiple edits; a condition; a delay in user activity via a graphical user interface; a predetermined time; a predetermined number of lines; a length of a queue; a predetermined size; a period of time since a most recent user action via a graphical user interface; a new context or area of the document, file, or configuration file; a size of the document, file, or configuration file; a number of edits; an order for edits; a bulk paste or delete operation based on multiple add or delete edit operations; a difference; a state of a document, file, or configuration file; a pre-edit state;

a post-edit state; and a calculated difference between two states.

Figure 6:
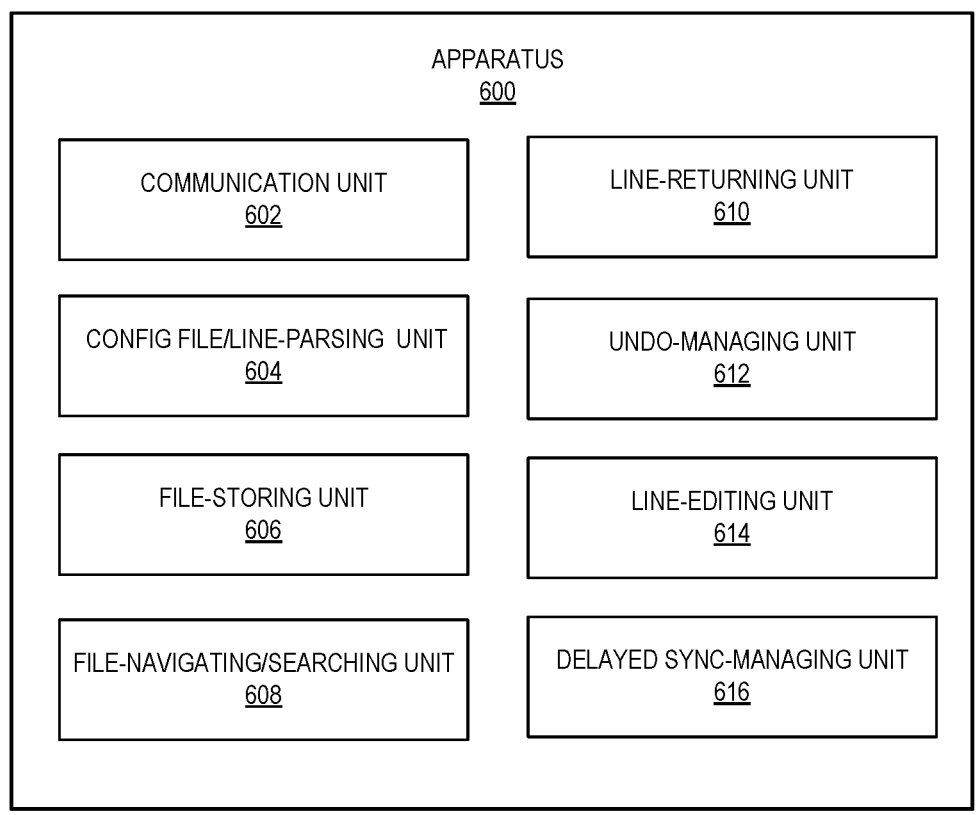
FIG. 6 illustrates an apparatus which facilitates performant run-time parsing and editing in a client-server model, in accordance with an aspect of the present application.

FIG. 6 illustrates an apparatus which facilitates performant run-time parsing and editing in a client-server model, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 can comprise modules or units 602-616 which are configured to perform functions or operations similar to modules 520-534 of computer system 500 of FIG. 5, including: a communication unit 602; a configuration file/line-parsing unit 604; a file-storing unit 606; a file-navigating/searching unit 608; a line-returning unit 610; an undo-managing unit 612; a line-editing unit 614; and a delayed sync-managing unit 616.

In general, the disclosed aspects provide a system for facilitating performant run-time parsing and editing in a client-server model. In one aspect, during operation, the system receives, from a client, a first request for a document which is parsed based on a syntax. The system parses, based on the syntax, an initial number of lines of the document. The system returns the parsed initial number of lines to the client, thereby allowing the client to display the parsed initial number of lines in a visible window of the display. Subsequent to successfully parsing a remainder of the lines of the document, the system stores a fully-parsed version of the document. Responsive to a scrolling action in the visible window, the system provides a relevant portion of an unparsed document associated with the first request. Responsive to detecting a termination of the scrolling action, the system receives a second request for parsed lines corresponding to a first set of lines, e.g., in the visible window. The system returns the corresponding parsed lines from the fully-parsed version or parses a section of the document corresponding to the first set of lines to return the corresponding parsed lines, thereby allowing the client to display the corresponding parsed lines in the visible window.

In a variation on this aspect, the system returns the parsed initial number of lines while concurrently parsing the remainder of the lines of the document in one or more stages. Subsequent to successfully parsing lines for a respective stage, the system performs at least one of: storing the successfully parsed lines for the respective stage; and returning the successfully parsed lines for the respective stage, thereby allowing the client to perform at least one of: receiving the successfully parsed lines for the respective stage; and storing the successfully parsed lines for the respective stage.

In a further variation on this aspect, responsive to determining that the fully-parsed version is stored or available, the system returns the corresponding parsed lines from the fully-parsed version. Responsive to determining that the fully-parsed version is not stored or available, the system parses the section of the document corresponding to the first set of lines and returns the parsed section as the corresponding parsed lines.

In a further variation, returning the parsed initial number of lines to the client further allows the client to, responsive to receiving the parsed initial number of lines, store the parsed initial number of lines, wherein the initial number of lines is associated with the visible window of the display. Returning the corresponding parsed lines to the client further allows the client to, responsive to receiving the corresponding parsed lines, store the corresponding parsed lines. The system returns the fully-parsed version of the document to the client, thereby allowing the client to, responsive to receiving the fully-parsed version of the document, store the fully-parsed version of the document.

In a further variation, responsive to a determination that the scrolling action occurs during a predetermined time window, the system receives a third request for parsed lines corresponding to an estimated visible window, wherein the estimated visible window is based on at least one of: a speed of scrolling based on an amount of the scrolling action during the predetermined time window; and an estimation of a percentage of the document scrolled through based on the amount of the scrolling action during the predetermined time window. The predetermined time window can refer to the window of time after receiving the initial response (i.e., the parsed initial number of lines) and prior to receiving the fully-parsed version.

In a further variation, the system determines a first edit associated with a line of a second set of lines, e.g., in the visible window. The system receives, based on the first edit, a fourth request for updated parsed lines corresponding to the second set of lines. The system parses the document based on the first edit. The system returns an updated parsed document or the updated parsed lines corresponding to the second set of lines, thereby allowing the client to, responsive to receiving the updated parsed document or the updated parsed lines, perform at least one of: storing the updated parsed document or the updated parsed lines; and displaying the updated parsed lines in the visible window.

In a further variation, the system determines a plurality of edits associated with a plurality of lines of the parsed document, wherein the plurality of edits are stored in a queue of the client until a condition is detected, thereby allowing the client to, responsive to the condition being detected, determine an order in which to transmit the edits.

In a further variation, detecting the condition comprises at least one of: determining a delay in user activity via a graphical user interface on the client which is greater than a predetermined period of time; detecting that the user has generated a specific synchronization command via the graphical user interface; detecting that the user is editing a section of the document which is greater than a predetermined number of lines apart from the plurality of edits associated with the plurality of lines; and determining that a length of the queue is greater than a predetermined size.

In a further variation, the condition is based on at least one of: a period of time since a most recent user action is initiated via the graphical user interface; a user action initiated via the graphical user interface in an area of the document which is different from an area associated with visible windows which include the plurality of lines; a size of the document; and a number of the plurality of edits.

In a further variation, the edits include at least one of an add operation, a modify operation, and a delete operation. Determining the order in which to transmit the edits is based on at least one of: an order of the plurality of edits as entered by the user; an order of the plurality of edits based on an order in which the edits occur in the document; multiple edits submitted as a single bulk edit operation; all add actions as a single bulk paste operation; and all delete operations as a single bulk delete operation.

In a further variation, the system determines a second edit associated with a line of a third set of lines, e.g., in the visible window. The system receives, based on the second edit, a fifth request for updated parsed lines corresponding to the third set of lines. The system calculates a difference between a first state of the document and a second state of the document, wherein the first state corresponds to a state of the document prior to the one or more edits and the second state corresponds to a state of the document subsequent to the one or more edits. The system stores the calculated difference. The system returns the calculated difference to the client, thereby allowing the client to, responsive to receiving the calculated difference: determine, based on the third set of lines and the calculated difference, updated parsed lines; store at least one of the calculated difference and the updated parsed lines; and display the updated parsed lines.

In a further variation, the system uses the calculated difference to perform a subsequent undo operation.

In a further variation, the system determines a user activation of a reference link via a graphical user interface on the client. The system receives, based on the user activation of the reference link, a sixth request for parsed lines mapped to the reference link. Responsive to determining that the fully-parsed version is not stored or available, the system: performs a filtered parse of the document by omitting lines with indents greater than a predetermined number of spaces; creates, based on the filtered parse, a lookup table which maps reference links to parsed lines; and returns the parsed lines mapped to the reference link. Responsive to determining that the fully-parsed version is stored or available, the system: searches a lookup table which is previously created based on the fully-parsed version; and returns the parsed lines mapped to the reference link, thereby allowing the client to, responsive to receiving the parsed lines mapped to the reference link, display the parsed lines mapped to the reference link in the visible window.

In a further variation, the first request is received via at least one of: an editor on the client; and an automated program via an application programming interface. The document is a network configuration file for at least one network device. The relevant portion of the unparsed document is provided for at least one of: display in the visible window; and use by the automated program. The first set of lines is based on at least one of: lines in the visible window; and lines determined by the automated program.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   receiving, from a client, a first request for a document which is parsed based on a syntax;
   parsing, based on the syntax, an initial number of lines of the document;
   returning the parsed initial number of lines to the client, thereby allowing the client to display the parsed initial number of lines in a visible window of the display;
   subsequent to successfully parsing a remainder of the lines of the document, storing a fully-parsed version of the document;
   responsive to a scrolling action in the visible window, providing a relevant portion of an unparsed document associated with the first request;
   responsive to detecting a termination of the scrolling action, receiving a second request for parsed lines corresponding to a first set of lines; and
   returning the corresponding parsed lines from the fully-parsed version or parsing a section of the document corresponding to the first set of lines to return the corresponding parsed lines, thereby allowing the client to display the corresponding parsed lines in the visible window.

2. The method of claim 1, further comprising:
   returning the parsed initial number of lines while concurrently parsing the remainder of the lines of the document in one or more stages; and
   subsequent to successfully parsing lines for a respective stage, performing at least one of:
     storing the successfully parsed lines for the respective stage; and
     returning the successfully parsed lines for the respective stage,
   thereby allowing the client to perform at least one of:
     receiving the successfully parsed lines for the respective stage; and
     storing the successfully parsed lines for the respective stage.

3. The method of claim 1, further comprising:
   responsive to determining that the fully-parsed version is stored or available, returning the corresponding parsed lines from the fully-parsed version; and
   responsive to determining that the fully-parsed version is not stored or available, parsing the section of the document corresponding to the first set of lines and returning the parsed section as the corresponding parsed lines.

4. The method of claim 1,
wherein returning the parsed initial number of lines to the client further allows the client to, responsive to receiving the parsed initial number of lines, store the parsed initial number of lines, wherein the initial number of lines is associated with the visible window of the display,
wherein returning the corresponding parsed lines to the client further allows the client to, responsive to receiving the corresponding parsed lines, store the corresponding parsed lines, and
wherein the method further comprises returning the fully-parsed version of the document to the client, thereby allowing the client to, responsive to receiving the fully-parsed version of the document, store the fully-parsed version of the document.

5. The method of claim 1, further comprising:
responsive to a determination that the scrolling action occurs during a predetermined time window, receiving a third request for parsed lines corresponding to an estimated visible window, wherein the estimated visible window is based on at least one of:
a speed of scrolling based on an amount of the scrolling action during the predetermined time window; and
an estimation of a percentage of the document scrolled through based on the amount of the scrolling action during the predetermined time window.

6. The method of claim 1, further comprising:
determining a first edit associated with a line of a second set of lines;
receiving, based on the first edit, a fourth request for updated parsed lines corresponding to the second set of lines;
parsing the document based on the first edit; and
returning an updated parsed document or the updated parsed lines corresponding to the second set of lines, thereby allowing the client to, responsive to receiving the updated parsed document or the updated parsed lines, perform at least one of:
storing the updated parsed document or the updated parsed lines; and
displaying the updated parsed lines in the visible window.

7. The method of claim 1, further comprising:
determining a plurality of edits associated with a plurality of lines of the parsed document, wherein the plurality of edits are stored in a queue of the client until a condition is detected, thereby allowing the client to, responsive to the condition being detected, determine an order in which to transmit the edits.

8. The method of claim 7, wherein detecting the condition comprises at least one of:
determining a delay in user activity via a graphical user interface on the client which is greater than a predetermined period of time;
detecting that the user has generated a specific synchronization command via the graphical user interface;
detecting that the user is editing a section of the document which is greater than a predetermined number of lines apart from the plurality of edits associated with the plurality of lines; and
determining that a length of the queue is greater than a predetermined size.

9. The method of claim 7, wherein the condition is based on at least one of:
a period of time since a most recent user action is initiated via the graphical user interface;
a user action initiated via the graphical user interface in an area of the document which is different from an area associated with visible windows which include the plurality of lines;
a size of the document; and
a number of the plurality of edits.

10. The method of claim 7,
wherein the edits include at least one of an add operation, a modify operation, and a delete operation, and
wherein determining the order in which to transmit the edits is based on at least one of:
an order of the plurality of edits as entered by the user;
an order of the plurality of edits based on an order in which the edits occur in the document;
multiple edits submitted as a single bulk edit operation;
all add actions as a single bulk paste operation; and
all delete operations as a single bulk delete operation.

11. The method of claim 1, further comprising:
determining a second edit associated with a line of a third set of lines;
receiving, based on the second edit, a fifth request for updated parsed lines corresponding to the third set of lines;
calculating a difference between a first state of the document and a second state of the document, wherein the first state corresponds to a state of the document prior to the one or more edits and the second state corresponds to a state of the document subsequent to the one or more edits;
storing the calculated difference; and
returning the calculated difference to the client, thereby allowing the client to, responsive to receiving the calculated difference:
determine, based on the third set of lines and the calculated difference, updated parsed lines;
store at least one of the calculated difference and the updated parsed lines; and
display the updated parsed lines.

12. The method of claim 11, further comprising:
using the calculated difference to perform a subsequent undo operation.

13. The method of claim 1, further comprising:
determining a user activation of a reference link via a graphical user interface on the client;
receiving, based on the user activation of the reference link, a sixth request for parsed lines mapped to the reference link;
responsive to determining that the fully-parsed version is not stored or available:
performing a filtered parse of the document by omitting lines with indents greater than a predetermined number of spaces;
creating, based on the filtered parse, a lookup table which maps reference links to parsed lines; and
returning the parsed lines mapped to the reference link; and
responsive to determining that the fully-parsed version is stored or available:
searching a lookup table which is previously created based on the fully-parsed version; and
returning the parsed lines mapped to the reference link; and
thereby allowing the client to, responsive to receiving the parsed lines mapped to the reference link, display the parsed lines mapped to the reference link in the visible window.

14. The method of claim 1,
wherein the first request is received via at least one of:
  an editor on the client; and
  an automated program via an application programming interface,
wherein the document is a network configuration file for at least one network device,
wherein the relevant portion of the unparsed document is provided for at least one of:
  display in the visible window; and
  use by the automated program, and
wherein the first set of lines is based on at least one of:
  lines in the visible window; and
  lines determined by the automated program.

15. A computer system, comprising:
a processor; and
a memory coupled to the processor and storing instructions which, when executed by the processor, cause the processor to perform a method, the method comprising:
receiving, from a client, a first request for a document which is parsed based on a syntax;
parsing, based on the syntax, an initial number of lines of the document;
returning the parsed initial number of lines to the client, thereby allowing the client to display the parsed initial number of lines in a visible window of the display;
subsequent to successfully parsing a remainder of the lines of the document, storing a fully-parsed version of the document;
responsive to a scrolling action in the visible window, providing a relevant portion of an unparsed document associated with the first request;
responsive to detecting a termination of the scrolling action, receiving a second request for parsed lines corresponding to a first set of lines; and
returning the corresponding parsed lines from the fully-parsed version or parsing a section of the document corresponding to the first set of lines to return the corresponding parsed lines, thereby allowing the client to display the corresponding parsed lines in the visible window.

16. The computer system of claim 15, wherein the method further comprises:
returning the parsed initial number of lines while concurrently parsing the remainder of the lines of the document in one or more stages;
subsequent to successfully parsing lines for a respective stage, performing at least one of:
  storing the successfully parsed lines for the respective stage; and
  returning the successfully parsed lines for the respective stage; and
responsive to determining that the fully-parsed version is not stored or available, parsing the section of the document corresponding to the first set of lines and returning the parsed section as the corresponding parsed lines.

17. The computer system of claim 15, wherein the method further comprises:
responsive to a determination that the scrolling action occurs during a predetermined time window, receiving a third request for parsed lines corresponding to an estimated visible window, wherein the estimated visible window is based on at least one of:
  a speed of scrolling based on an amount of the scrolling action during the predetermined time window; and
  an estimation of a percentage of the document scrolled through based on the amount of the scrolling action during the predetermined time window.

18. The computer system of claim 15, wherein the method further comprises:
determining a first edit associated with a line of a second set of lines;
receiving, based on the first edit, a fourth request for updated parsed lines corresponding to the second set of lines;
parsing the document based on the first edit; and
returning an updated parsed document or the updated parsed lines corresponding to the second set of lines, thereby allowing the client to, responsive to receiving the updated parsed document or the updated parsed lines, perform at least one of:
  storing the updated parsed document or the updated parsed lines; and
  displaying the updated parsed lines in the visible window.

19. The computer system of claim 15, wherein the method further comprises:
determining a second edit associated with a line of a third set of lines;
receiving, based on the second edit, a fifth request for updated parsed lines corresponding to the third set of lines;
calculating a difference between a first state of the document and a second state of the document, wherein the first state corresponds to a state of the document prior to the one or more edits and the second state corresponds to a state of the document subsequent to the one or more edits;
storing the calculated difference; and
returning the calculated difference to the client, thereby allowing the client to, responsive to receiving the calculated difference:
  determine, based on the third set of lines and the calculated difference, updated parsed lines;
  store at least one of the calculated difference and the updated parsed lines; and
  display the updated parsed lines.

20. A non-transitory computer-readable storage medium storing instructions that when executed by a computer cause the computer to perform a method, the method comprising:
receiving, via an editor on a client, a first request for a document which is parsed based on a syntax;
parsing, based on the syntax, an initial number of lines of the document;
returning the parsed initial number of lines to the client while concurrently parsing a remainder of the lines of the document, thereby allowing the client to display the parsed initial number of lines in a visible window of the display;
subsequent to successfully parsing the remainder of the lines, storing a fully-parsed version of the document;
responsive to a scrolling action in the visible window, providing a relevant portion of an unparsed document associated with the first request;
responsive to detecting a termination of the scrolling action, receiving a second request for parsed lines corresponding to a first set of lines; and
returning the corresponding parsed lines from the fully-parsed version or parsing a section of the document corresponding to the first set of lines to return the corresponding parsed lines, thereby allowing the client to display the corresponding parsed lines in the visible window.

\* \* \* \* \*